April 18, 1961 E. P. HARRIS ET AL 2,980,167
SEAT CONSTRUCTION
Filed July 18, 1957 3 Sheets-Sheet 1

INVENTORS
James R. Wall
BY Edward P. Harris

Their Attorney

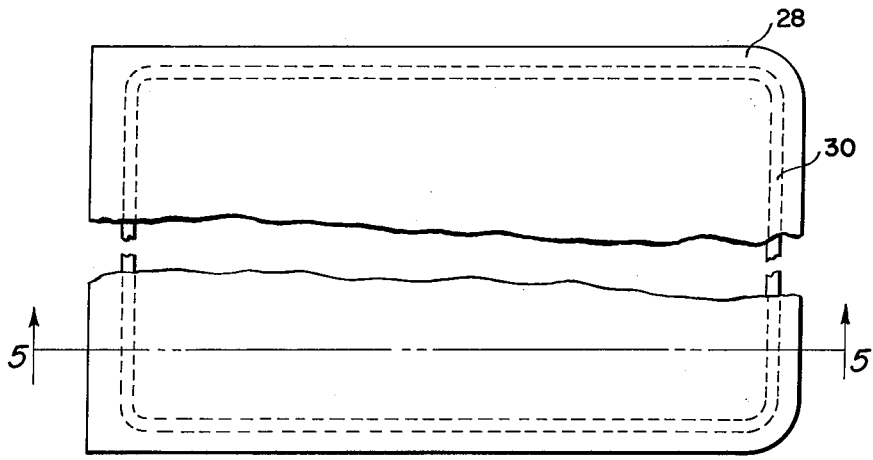
Fig. 4
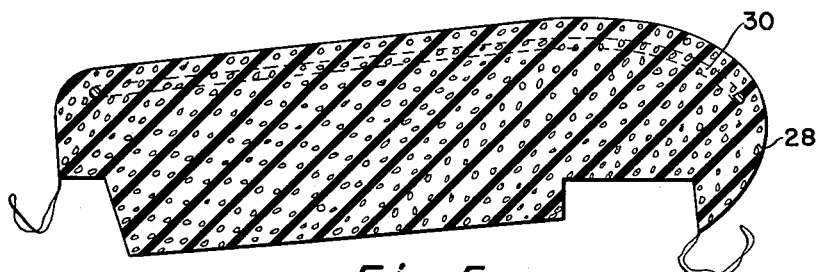
Fig. 5
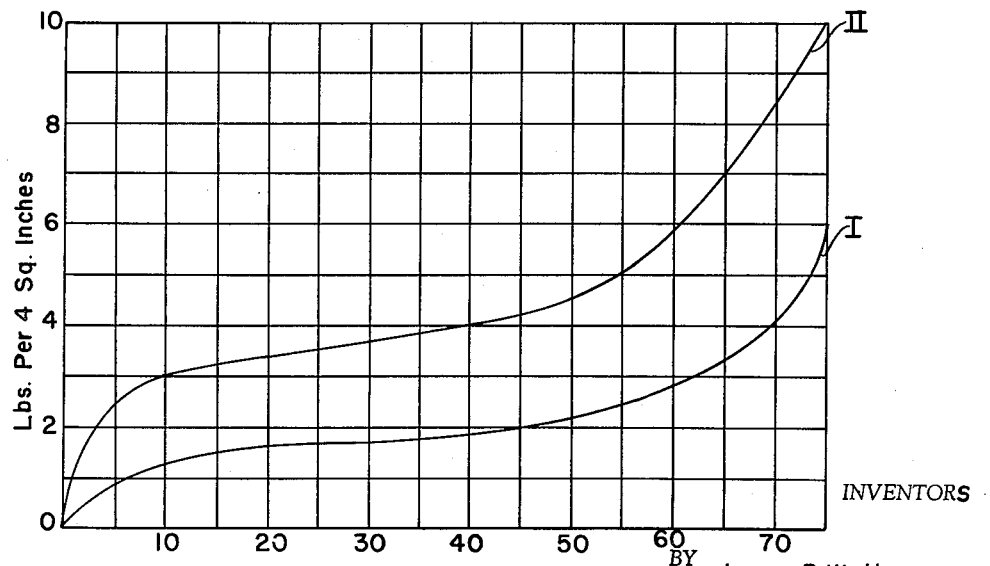
Fig. 6   % Deflection

United States Patent Office 2,980,167
Patented Apr. 18, 1961

2,980,167

SEAT CONSTRUCTION

Edward P. Harris and James R. Wall, Dayton, Ohio, assignors to General Motors Corporation, Detroit, Mich., a corporation of Delaware Filed July 18, 1957, Ser. No. 672,650

5 Claims. (Cl. 155—179)

This invention relates to seat construction and more particularly to vehicular seat construction utilizing foamed elastomers as a cushioning and shock absorbing agent.

In conventional seat construction, particularly automobile seat construction, it is common practice to provide an upper or topper pad of sufficient thickness to provide a pleasing "feel" and/or "rideability" which is supported by a plurality of coil springs or other metal spring members for absorbing shock incident to riding over rough roads or to the seat occupant seating heavily in the seat. Since metal springs have load-deflection characteristics wherein the load bears a substantially linear relationship to the deflection in accordance with Hooke's law, within the operating range of these members, these seat constructions are relatively lively and react to cause the seat occupant to be thrown about when riding over relatively severe road bumps and the like.

It is an object of this invention to provide an efficient, economical and relatively simple seat construction wherein the load-deflection characteristics may readily be varied in the manufacture thereof which comprises a plurality of layers of resilient and relatively elastic polyurethane foam, each layer having a different hardness or load-deflection characteristics.

It is a further object of this invention to provide a seat construction wherein a polyurethane foamed cushion which is relatively soft is supported by a second cushion of polyurethane foam which is relatively hard to provide improved dampening and stability. Yet another object of the invention is to provide a polyurethane foam seat cushion of improved stability which includes a rigid reinforcing member embedded therein in the near vicinity of the upper edges thereof.

Further objects and advantages of the present invention will be apparent from the following description, reference being had to the accompanying drawings wherein a preferred embodiment of the invention is clearly shown.

In the drawings:

Fig. 4 is a top view of a seat construction illustrating another embodiment of the invention.

Fig. 5 is a cross sectional view taken along line 5—5 of Fig. 4.

Fig. 6 is a graph showing load-deflection curves for relatively hard and soft polyurethane foams utilized in the present invention.

Figure 1:
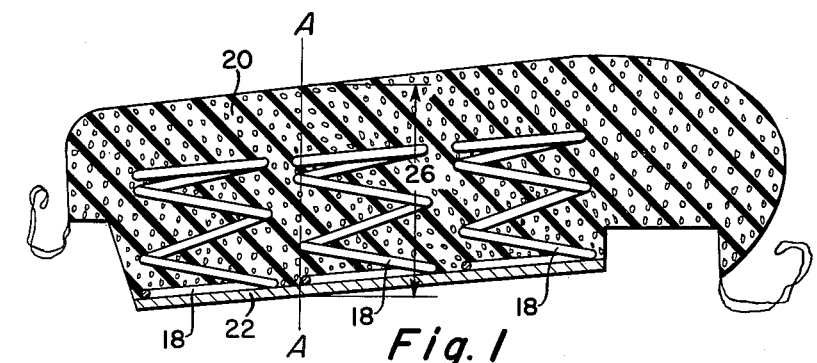
Fig. 1 is a cross sectional view of a seat construction suitable for use in an automobile body embodying the present invention.

The invention will now be described in detail with reference to an automobile seat construction although it will be obvious that the invention is applicable to other vehicular seat constructions and to household furniture such as davenports, couches, chairs and the like.

Elastomeric foam materials which are particularly useful in carrying out the present invention are the polyurethane foams having a density ranging from about 1–10 lbs. per cubic ft. These foams may be formed by reacting a wide variety of polymeric materials such as polyesters, polyesteramides, polyalkylene glycol, castor oil and other materials having a plurality of reactive hydrogen groups, with organic polyisocyanates, in the presence of accelerators and/or cross linking agents and/or other addition agents such as plasticizers for modifying the characteristics of the foam. The formation of foamed polyurethane plastics involves a series of complex, physical and chemical reactions in which the evolution of carbon dioxide gas resulting from a reaction of carboxyl and isocyanate groups and/or between water and isocyanate groups causes the foamed or cellular character of these plastics.

Examples of suitable polymeric materials which may be used in the production of suitable foams for use in the present invention are polyesters and polyesteramides such as may be obtained by condensing a variety of polybasic acids, preferably dibasic acids such as adipic, sebacic, phthalic, oxalic, malonic, succinic, maleic, fumaric, itaconic, etc. with polyalcohols such as ethylene glycol, diethylene glycol, glycerol, sorbitol and/or amino alcohols such as ethanolamine and amino propanol. Alkylene glycols and polyoxyalkylene glycols which may be used include ethylene glycol, propylene glycol, styrene glycol, diethylene glycol and polypropylene glycol and copolymers of these glycols. A high grade castor oil may also be used.

Examples of suitable organic polyisocyanates which may be used include aromatic isocyanates such as toluene 2,4 diisocyanate, toluene 2,6 diisocyanate and mixtures thereof, naphthalene 1,5 diisocyanate and M-phenylene diisocyanate, etc. and mixtures of these materials.

Examples of components which may be used for promoting the polyaddition reaction between the above mentioned polymeric materials having free hydrogen reactive groups and the organic polyisocyanates, and providing essential acceleration of the reaction include ethyl ethanolamine, diethyl ethanolamine, pyridine, hexahydro dimethylaniline, methyl piperazine, dimethyl piperazine, tribenzyl amine, N-morpholine, N-methyl morpholine, and N-ethyl morpholine.

A particular feature of the resilient and elastic polyurethane foams utilized in the present invention is their characteristic load-deflection curves illustrated by curve I of Fig. 6. It will be observed that this curve departs markedly from a substantially linear curve relating to metal springs and rubber in that from the origin to about 15% deflection, the curve is concave downwardly, from about 15% deflection to about 55% deflection, the curve is substantially flat and linear or slightly concave upwardly, and from the latter point the curve becomes relatively steep and concave upwardly. The portion of the curve between about 15 and 55% deflection which may be termed a "plateau" in a curve, illustrates that a seat cushion made of the material is readily deflected in the plateau portion to a large degree by a relatively small increase in load whereby a seat occupant tends to comfortably settle into the seat cushion and shock is effectively absorbed.

Figure 7:
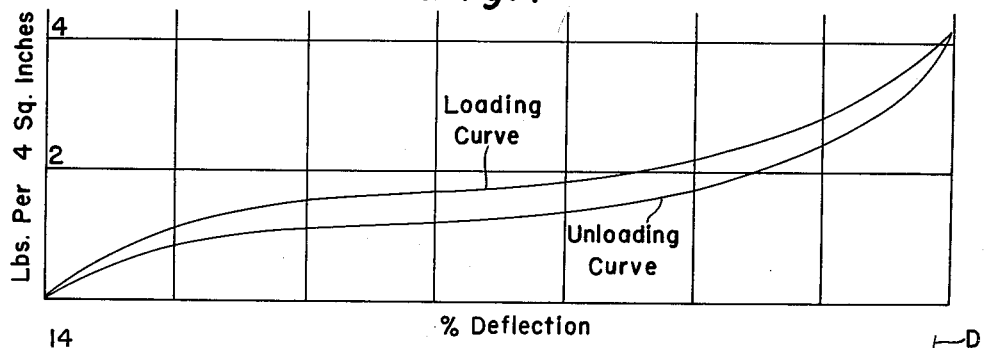
Fig. 7 is a graph comparing loading and unloading load-deflection curves of the polyurethane foams utilized in the present invention.

Another desirable feature of the polyurethane foams is the hysteresis effect illustrated by the loading and unloading load deflection curves of Fig. 7. It will be noted that these two curves form what may be termed a hysteresis loop. The fact that the loading curve lags the unloading curve indicates that the cushion will not tend to react against a seat occupant or to closely follow the seat occupant in vertical movement with the result that a smoother ride is obtained.

Figure 2:
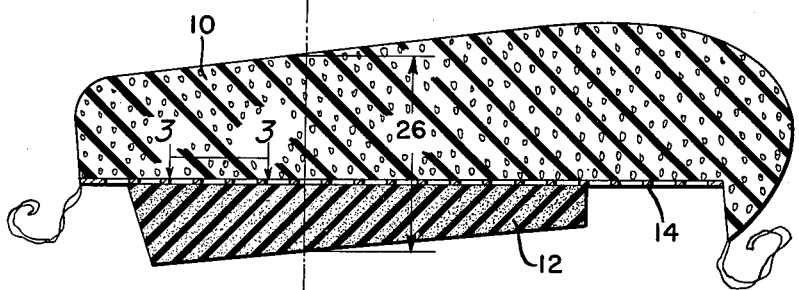
Fig. 2 is a cross sectional view of a seat construction illustrating another embodiment of the invention.

In accordance with the present invention as is illustrated in Fig. 2, a seat construction is provided which includes an upper or topper pad 10 of relatively "soft" polyurethane foam which is supported by a second pad 12 of relatively "hard" polyurethane foam. The terms "hard" and "soft" foam as used herein refer to the relative amount of load necessary to impose on the foam pad to produce a given amount of deflection. Thus a foam which requires a load of 1 lb. per sq. inch to effect a given deflection is termed a soft foam as compared to one which requires a load of 2 lbs. per sq. inch to effect the same deflection. In Fig. 6, the load-deflection curve I illustrates a suitable soft foam for use as the topper pad 10 and the load-deflection curve II illustrates a suitable hard foam for use as a supporting pad 12.

A soft foam pad having the load-deflection curve I of Fig. 6, a density of 1.93 lbs. per cubic ft. which may be deflected about 3 or 4 inches by a seat occupant of average weight and provides a pleasing seating sensation and hand "feel" may be prepared as follows: A first polymeric ingredient is prepared which is a copolymer of polyoxypropylene glycol and polyoxyethylene glycol and may be described by the formula $$HO(C_2H_4O)_a(C_3H_6O)_b(C_2H_4O)_cH$$

This copolymer may be regarded as ethylene oxide condensed on a polyoxypropylene base wherein the molecular weight of the polyoxypropylene base unit is about 1501 to 1800 and the ethylene oxide in the molecule is from 10–20%. A second polymeric ingredient is prepared which may be described by the following formula:

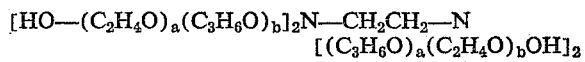

wherein the molecular weight of the polypropylene base is in the range of 2501 to 3000 and the ethylene oxide in the molecule is in the range of from 10–19%. Seventy-five parts by weight of the first described polymeric ingredient and 25 parts by weight of the second described polymeric ingredient are then fully reacted with 43.10 parts of a mixture consisting of 80% 2,4 toluene diisocyanate and 2,6 toluene diisocyanate to which is added 6.80 parts of didecyl phthalate to produce a prepolymer containing about 9.5% free isocyanate groups. A catalyst component is prepared consisting of 1 part N-methyl morpholine by weight, .3 part triethylamine and 2.6 parts water to which has been added about ½ part of a defoaming agent such as a silicone oil. One hundred parts by weight of the prepolymer components are then mixed with 3.5 parts of the catalyst components and in a few minutes the mixture reacts and sets up to produce the soft polymeric foam.

A hard foam pad having the load-deflection curve II of Fig. 6 and a density of about 2.3 lbs. per cubic ft. may be prepared as follows: A prepolymer component containing about 9.5% free isocyanate groups is prepared by fully reacting 100 parts by weight of the copolymer of polyoxypropylene glycol and polyoxyethylene glycol described in connection with the above described soft foam composition, 6 parts trimethylol propane and 53 parts of the toluene diisocyanate mixture described above. A catalyst component is prepared containing about 37% N-methyl morpholine and 63% water. One hundred parts of the prepolymer component to which has been added about ½ part of the silicone oil deforming agent are intimately mixed with 4½ parts of the catalyst component and the mixture reacts and sets up in a few minutes to produce the hard foam.

Figure 8:
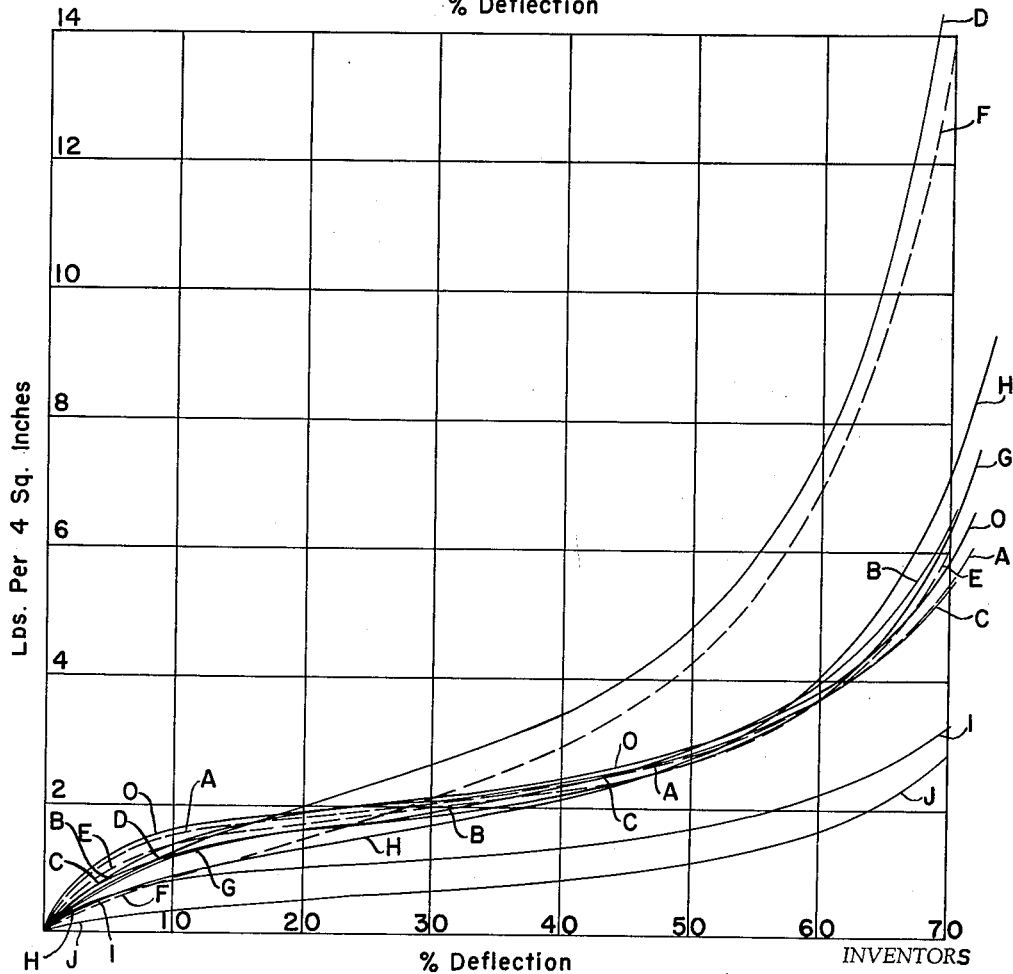
Fig. 8 is a graph illustrating the effect of various plasticizers on the load-deflection curves of polyurethane foams utilized in the present invention.

As is apparent from the above examples, the relative hardness of the polyurethane foam may be varied by a suitable selection in suitable proportions of the initial foam forming ingredients. It has also been found that the relative hardness of the polyurethane foams may be varied by the inclusion of the plasticizers in predetermined amounts in the foam formulation. Fig. 8 and the following table illustrate the fact that the percentage deflection can be varied relative to the load by adding various plasticizers to the soft foam formulation described in connection with the curve I in Fig. 6 wherein the didecyl phthalate plasticizer thereof is omitted. The curves shown in Fig. 8 as well as those shown in Figs. 6 and 7 were obtained utilizing test samples 1 inch thick. The numerals 1–5 in the chart below correspond to the plasticizers didecyl phthalate, dioctyl sebacate, dibutoxy ethyl phthalate, tricresyl phosphate, polyethylene glycol 400 mono-laurate, respectively.

|  | Parts by Weight | | | | |
| --- | --- | --- | --- | --- | --- |
|  | 1 | 2 | 3 | 4 | 5 |
| Curve O | (1) | (1) | (1) | (1) | (1) |
| Curve A | 10 | | | | |
| Curve B | 30 | | | | |
| Curve C | | 10 | | | |
| Curve D | | 30 | | | |
| Curve E | | | 10 | | |
| Curve F | | | 30 | | |
| Curve G | | | | 10 | |
| Curve H | | | | 30 | |
| Curve I | | | | | 10 |
| Curve J | | | | | 30 |

[1] No plasticizer.

It will be noted that a comparison of curve O relating to a formulation involving no plasticizers with the curves A through J, it is apparent that the addition of 10–30 parts of didecyl phthalate and tricresyl phosphate as evidenced by curves D, C, G and H has no appreciable effect on the hardness of the foam, that the addition of 10 parts dioctyl sebacate and 10 parts dibutoxy ethyl phthalate as evidenced by curves C and E has no appreciable effect on the foam but that the addition of 30 parts of the latter as evidenced by curves D and F markedly increase the hardness of the foam, and finally that the addition of 10 parts and 30 parts of polyethylene glycol 400 mono-laurate as evidenced by curves I and J markedly decreases the hardness of the foam. Thus it may be seen that the inclusion of suitable plasticizers in suitable amounts, as for example is illustrated by the curves D and J, the relative hardness of the foam may be varied over a wide range.

Figure 3:
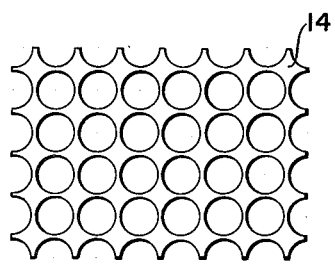
Fig. 3 is a cross sectional view of a further embodiment of the invention shown along line 3—3 of Fig. 2.

In the seat construction shown in Fig. 2, the pad 10 is preferably first molded and the pad 12 is subsequently molded to the base of the pad 10 to form a unitary and completed seat construction which need only be positioned on a suitable rigid supporting structure (not shown). Desirably the unitary completed seat pad construction may be positioned directly on raised portions of an automobile floor pan formed integrally therewith. The hardness of the composite seat cushion may further be varied by a variation of the thickness of the soft pad 10 relative to the thickness of the hard pad 12, a thinner pad being harder than a thicker one. In the operation of molding the pad 10, a skin is normally formed on the outer surfaces of the pad. The skin on the upper pad 10 and the skin of the lower pad 12 adjacent each other, together function to distribute the weight of the seat occupant over a larger area of the lower pad 12 than the upper pad 10 to prevent undue sinking of the seat occupant into the seat structure, particularly undue penetration due to the impact caused by severe bumps and the like and thereby in effect increase the hardness of the lower pad. The load may be more fully distributed by providing a relatively tough fabric such as a canvas or duck cloth on the underside of the pad 10 adhesively attached thereto which serves as a flexible relative inelastic inner layer between the upper pads 10 and 12 respectively. A weight distributing effect intermediate that produced by the skin described above normally formed in molding the pad 10 and that produced by the aforementioned fabric layer may be obtained by the substitution of a perforated rubber liner 14 as shown in Fig. 3.

As pointed out above, the presence of the layer intermediate the upper and lower pads serves in effect to increase the hardness of the lower pad. Accordingly a further variation in hardness of the seat cushion may be obtained by making both the upper and lower pads of a soft character since the intermediate layer will in effect increase the hardness of the lower pad.

In operation the relatively soft topper pad 10 provides a pleasingly soft seat surface and tends to cushion impact thereon during the normal operation of the motor vehicle. The relatively harder lower pad 12 serves to efficiently absorb relatively heavy impact incident to severe bumps or the like in a manner such that the seat occupant is not exposed to the sensation of "hitting bottom" and the pads do not react so as to throw the seat occupant upwardly as in the case of metal spring pad supporting structures.

As shown in Fig. 1, a seat structure having layers of different hardnes may be formed by metal or embedding coil springs 18 in the lower portion of a single polyurethane foam cushion 20 both supported directly on a rigid backing or metal member 22 such as a floorboard or formed base as the case may be. The springs in this structure in the lower portions of the pad in effect increase the hardness thereof.

It may readily be seen that the seat construction of the present invention lends itself to a wide variation in its performance without markedly changing the basic seat structure so as to suit the personal preference of a customer.

The maximum thickness 26 of the seat construction is dictated largely by space considerations within the car and the minimum thickness by the desired hardness of the foam pads. The present seat construction permits a maximum thickness 26 which is markedly less than the thickness of presently used seats which is of considerable importance in view of the current trend in the direction of lowering the height of automotive vehicles. The soft pad 10 is preferably of a sufficient thickness to permit the seat occupant to comfortably settle into the seat to an extent of 3 to 4 inches particularly in the vicinity of the portion of the seat pad indicated by the plane A—A in Figs. 1 and 2 representing the plane of the center of gravity of an average seat occupant positioned in the seat. The thickness of the relatively hard pad is sufficient to provide adequate cushioning as is described above. The particular shape of the upper and lower pads, two variations of which are illustrated in Figs. 1 and 2 is largely a matter of choice depending on the performance desired of the seat cushion construction.

To facilitate turning of and improve lateral stability thereby to some extent, a soft seat cushion 28 as is illustrated in Figs. 4 and 5 is provided with a stiffening or reinforcing member 30 preferably of rigid material such as metal which is embedded in the soft cushion near the upper edge thereof. Since this reinforcing member "floats" in the foam, it is capable of providing a desirable stiffening of the edges and seat edge firmness without detracting from the shock absorbing capacity of the seat structure.

The seat structure of Fig. 2 is preferably provided with the edge reinforcing features of Figs. 4 and 5. The top surface of the seat cushion structure is provided with a suitable cover material such as a suitably attractive fabric or plastic material which is suitably attached to the top surface of the topper pad 10 preferably by molding the material directly against the cover material in the molding operation.

Although the present invention has been disclosed essentially in terms of a construction involving a relatively soft pad supported by a relatively hard pad, it is obvious that the construction may include additional foam pads of varied hardness as well as a topper pad formed of latex foam to further modify the performance of the seat construction.

While the embodiments of the present invention constitute a preferred form, it is to be understood that other forms might be adopted.

What is claimed is as follows:

1. A seat construction to be carried on a rigid support member, comprising, a combination of a polyurethane foam cushion portion having a soft smooth upper seat surface and having a non-linear load deflection including within the elastic limit thereof a relatively flat portion, a lower portion to supplement said soft polyurethane cushion portion in the form of means to increase hardness and to distribute weight exclusively while cushioning heavy impact as well as improving lateral stability as to the rigid support member and including a secondary polyurethane foam pad portion harder than said polyurethane foam cushion portion, said secondary smaller pad portion having a size smaller laterally and thinner in height than said cushion portion though only said secondary smaller pad has one surface directly in contact with the vehicle floor pan, and a perforated flexible though tough interlayer lining for equalization of load distribution directly between said cushion portion and said secondary pad portion, both said tough lining and said harder secondary pad portion serving to distribute weight and increase hardness for absorption of relatively heavy impact incident to severe bumps and the like such that a seat occupant is free of possible injury by hitting bottom on the rigid support member, said secondary pad portion and said cushion portion both being made of polyurethane foam material that provides a hysteresis effect for lag during unloading in reaction against loading force on said cushion portion so as to avoid sudden reaction that would throw the seat occupant upwardly.

2. A seat construction comprising, a first relatively soft polyurethane foam pad having a non-linear load-deflection curve within the elastic limit thereof having a first relatively flat curve portion and providing a skin surface of relatively large area, a second polyurethane foam pad relatively harder, smaller and thinner than said first pad and having a non-linear load-deflection curve within the elastic limit thereof having a second relatively flat curve portion though supporting said first pad along a skin surface area smaller than total skin surface area along an underside of said first pad, said first mentioned flat curve portion having a lesser slope than said second mentioned flat curve portion, and a weight distributing means interposed between said skin surfaces to have a weight distributing effect intermediate that produced by said first pad and said second pad relative to each other between skin surfaces, said relatively soft polyurethane foam pad having a relatively rigid reinforcing member embedded to float therein in the vicinity of the upper edges thereof to facilitate turning of and improve lateral stability of and stiffening of seat edges though remaining free of detracting from shock absorbing capacity of seat construction.

3. A seat construction comprising, a first pad having a non-linear load deflection curve within the elastic limit thereof having a first relatively flat curve portion, a second pad thinner and smaller than said first pad and having a non-linear load deflection curve within the elastic limit thereof having a second relatively flat curve portion supporting said first pad, said first mentioned flat curve portion having a lesser slope than said second flat curve portion, said first and second pads having differing hardness so as to assure severe shock absorption yet avoiding sudden reaction as evidenced by the differing non-linear deflection curves, and a flexible fibrous layer interposed laterally between said pads and bonded thereto.

4. A seat construction comprising, a first relatively soft polyurethane foam pad having a non-linear load-deflection curve within the elastic limit thereof having a first relatively flat curve portion and providing a skin surface of relatively large area, a second polyurethane foam pad relatively harder, smaller and thinner than said first pad and having a non-linear load-deflection curve within the elastic limit thereof having a second relatively flat curve portion though supporting said first pad along a skin surface area smaller than total skin surface area along an underside of said first pad, said first mentioned flat curve portion having a lesser slope than said second mentioned flat curve portion, and a weight distributing means interposed between said skin surfaces to have a weight distributing effect intermediate that produced by said first pad and said second pad relative to each other between skin surfaces, said weight distributing means including a thin intermediately-located sheet of perforated elastic liner attached between skin surfaces.

5. A seat construction comprising, a first relatively soft polyurethane foam pad having a non-linear load-deflection curve within the elastic limit thereof having a first relatively flat curve portion and providing a skin surface of relatively large area, a second polyurethane foam pad relatively harder, smaller and thinner than said first pad and having a non-linear load-deflection curve within the elastic limit thereof having a second relatively flat curve portion though supporting said first pad along a skin surface area smaller than total skin surface area along an underside of said first pad, said first mentioned flat curve portion having a lesser slope than said second mentioned flat curve portion, and a weight distributing means interposed between said skin surfaces to have a weight distributing effect intermediate that produced by said first pad and said second pad relative to each other between skin surfaces, said weight distributing means including a relatively tough intermediately-located fabric adhesively attached to the skin surface of said first foam pad and serving as a flexible but relatively inelastic inner layer between said first and second pads.

References Cited in the file of this patent

UNITED STATES PATENTS

| | | |
|---|---|---|
| 1,843,893 | Becher | Feb. 2, 1932 |
| 2,199,006 | Minor | Apr. 30, 1940 |
| 2,527,635 | Hoffman | Oct. 31, 1950 |
| 2,669,294 | Burdick et al. | Feb. 16, 1954 |
| 2,785,440 | Toulmin | Mar. 19, 1957 |
| 2,785,739 | McGregor et al. | Mar. 19, 1957 |
| 2,815,516 | Holton | Dec. 10, 1957 |